UNITED STATES PATENT OFFICE.

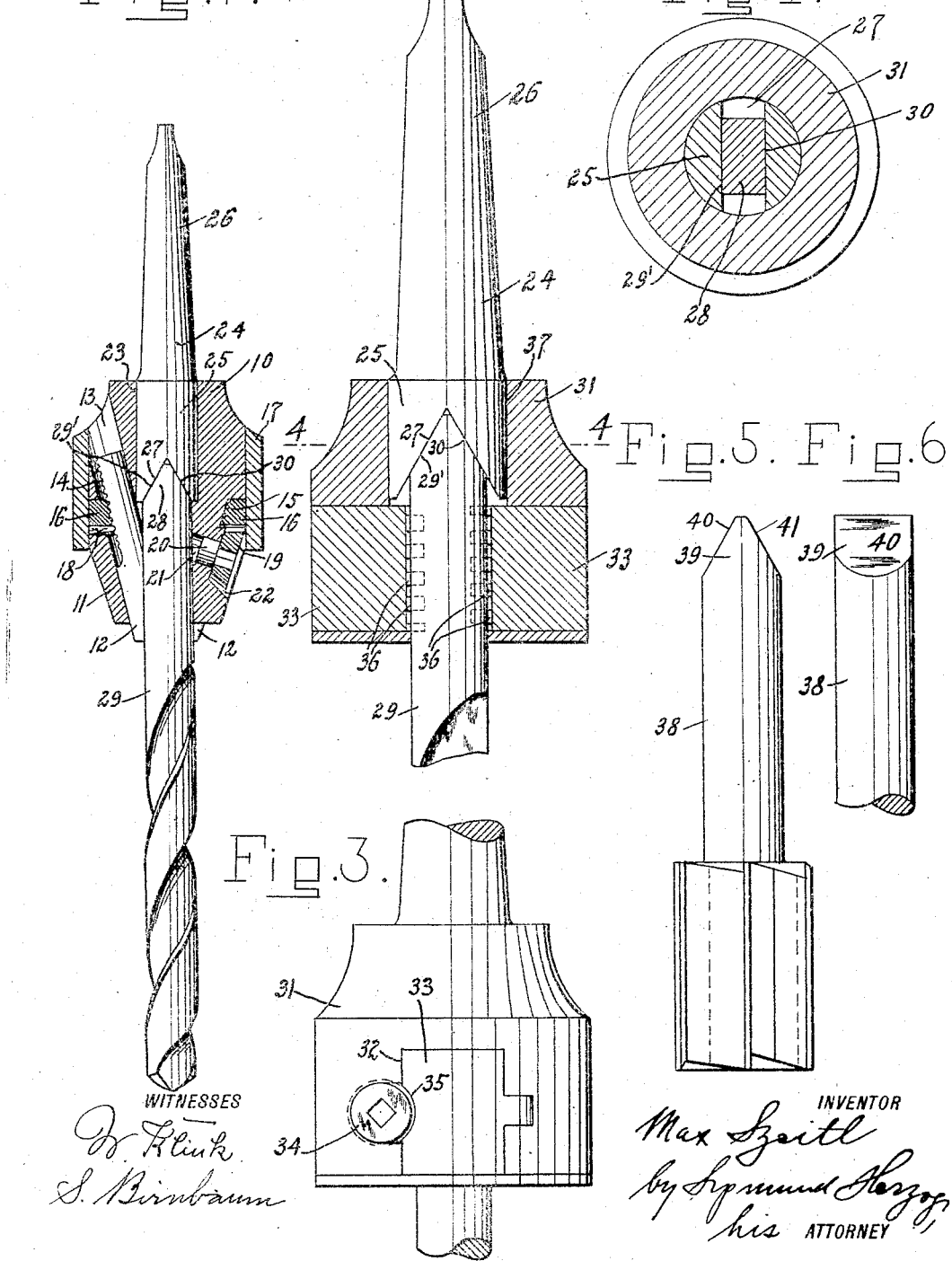
M. SZEITL.
ATTACHMENT FOR DRILL CHUCKS AND DRILLS.
APPLICATION FILED JULY 31, 1911.
1,035,495. Patented Aug. 13, 1912.

MAX SZEITL, OF STAMFORD, CONNECTICUT.

ATTACHMENT FOR DRILL-CHUCKS AND DRILLS.

1,035,495.  Specification of Letters Patent.  Patented Aug. 13, 1912.

Application filed July 31, 1911. Serial No. 641,457.

*To all whom it may concern:*

Be it known that I, MAX SZEITL, a subject of the King of Hungary, and resident of Stamford, in the county of Fairfield and State of Connecticut, have invented certain new and useful Improvements in Attachments for Drill-Chucks and Drills, of which the following is a specification.

The present invention relates to improvements in drills and similar tools, and to drill chucks, and more particularly to that class of chucks in which the drills or other similar tools are held by adjustable jaws.

Twist drills and other cutting tools, such as reamers and taps, have ordinarily cylindrical shanks. The drill chucks heretofore in use are provided with jaws which grip the cylindrical shanks of said tools for the purpose of centering the shanks in the chucks, and for holding the same against rotation relative to the bodies of the chucks. When such drills or other tools are in use for some time, their shanks are by the jaws of the chucks injured to some extent, due to the pressure which is exerted upon the same. Obviously such injured drills or other tools, when again inserted into the chuck, while kept from falling out from the chuck by the jaws thereof, will not be positively connected with the spindle of the drilling machine, and have, therefore, a movement relative to the chuck body, which will result in an improper performing of their work.

One of the objects of the present invention is to provide a drill chuck with an attachment, whereby the drill or other similar tool is always positively driven, the jaws of the chuck serving only as alining jaws, and to keep the drill from falling out.

Another object of the invention is to make the attachment above mentioned of such form as to adapt it to a varying number of sizes of drill shanks.

A further object of the invention is to form the ordinary cylindrical shanks of twist drills and other cutting tools in such a manner so as to fit the attachment, forming the subject matter of the present invention.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and minor details of construction without departing from the spirit or sacrificing any of the advantages of the invention.

A few of the many possible embodiments of the invention are illustrated in the accompanying drawings, in which:—

Figure 1 is a central vertical section taken through a drill chuck provided with the attachment, and holding a twist drill made in accordance with the present invention; Fig. 2 is a similar section of a chuck of another type; Fig. 3 is a side elevation of the chuck shown in Fig. 2; Fig. 4 is a section taken on line 4—4 of Fig. 2; Fig. 5 is a front elevation of a reamer constructed in accordance with the present invention; and Fig. 6 is a side elevation of a portion of the reamer shown in Fig. 5.

Referring now more particularly to Fig. 1 of the drawings, the same shows a drill chuck of a well known type, provided with the attachment forming the subject matter of the present invention. This chuck comprises a body 10, having a conical end 11, adapted to receive the tool shank and the jaws 12, which move in converging jaw recesses 13. The jaws 12 are provided with exterior screw-threads 14, which are engaged by the threads 15 of a sectional nut ring 16. A sleeve 17 surrounds the body 10 of the chuck, and holds the nut sections 16, to which it is rigidly connected, upon the chuck. The lower face of the nut sections are provided with bevel teeth 18, meshing with the teeth of a bevel pinion 19, which has a stem 20 fitting into an opening or socket 21 of the chuck body 10. The pinion itself lies within a recess 22. A vertical centrally arranged cylindrical bore 23 is provided in the body 10, for a purpose which will hereinafter appear.

The device as thus far described operates in the well known manner. More particularly, in rotating the pinion 19 by means of a key or other suitable instrument, the nut 16 will be turned and shifted, whereby the drill or other tool will be centered and gripped by the jaws 12. The jaws of the chuck hold the drill, or other tool, by their gripping action, or in other words by friction only.

The attachment forming the subject matter of the present invention comprises a shank 24, the lower portion 25 of which is cylindrical, and fits into the bore 23 of the chuck, to be connected with the chuck body in any manner known in the art. The upper portion 26 of the shank 24 tapers toward its upper end, and fits the spindle of the drilling machine. In the lower face of the cylindrical portion 25 of the shank 24 is formed a, preferably, V-shaped recess 27, its perfectly flat walls converging toward the portion 26 of the shank. The recess 27 is engaged by the flattened upper end 28 of the shank 29 of a twist drill. The flattened end 28 of the drill is also V-shaped in cross section, its flat surfaces 29' and 30 being arranged under an angle of about 60° to each other. The flat walls of the recess 27 are, of course, also arranged under the same angle to each other.

The operation of the device is as follows: Since the flattened end 28 of the drill 29 is in engagement with the walls of the recess 27 in the shank 24, a positive drive of the drill is obtained, the jaws of the chuck serving only to hold the drill in its central position and preventing it from falling out from the chuck. It will be observed that in providing a standard angle of inclination between the flat surfaces of the ends of the drills or other tools, and between the walls of the recesses 27 in the shank 24, a chuck constructed in accordance with the present invention will positively drive a drill or other tool of any size within the range of its jaws.

Referring now more particularly to Figs. 2 to 4, inclusive, it will be observed that the attachment is used upon a chuck adapted to accommodate larger sizes of drills. This chuck comprises a body 31, provided with diametrical grooves 32, 32, in which the jaws 33 are moved toward and away from the longitudinal axis of the chuck. The jaws are operated by screws 34, engaging a female screw 35, which is located partly in the jaws and partly in the chuck body. The jaws are provided with gripping teeth 36, 36, which are staggered with respect to each other upon the two jaws, allowing thereby the latter to be brought in close relation to each other when drills or other tools of very small sizes are used. In the chuck body is provided a vertical centrally arranged cylindrical recess 37, into which fits a shank 24 of a construction described in connection with Fig. 1 of the drawings. The operation of this chuck is similar to that shown in Fig. 1 of the drawings, the only difference being that the gripping jaws are operated in a different manner.

It should be observed that the attachment forming the subject matter of the present invention can be employed upon almost all known types of drill- and lathe-chucks.

In Figs. 5 and 6 a reamer is shown, which is constructed in accordance with the present invention, its shank 38 being provided with a flattened upper end 39, its flat surfaces 40 and 41 being arranged under an angle corresponding to that between the walls of the recess 27 in the shank 24 of the attachment hereinbefore described.

It is to be noted that the shanks of any other tools which are to be held by chucks either upon drilling machines or lathes can be provided with flattened upper ends in accordance with this invention.

What I claim is:—

In a device of the character described, a drill chuck comprising a body portion having a centrally arranged vertical cylindrical bore, a plurality of jaws slidably arranged thereon, means for shifting said jaws into contact with a shank whereby the latter is held against longitudinal movement upon said chuck, and a shank inserted in said bore having a substantially V-shaped recess in its lower face, substantially as and for the purpose specified.

Signed at Stamford, in the county of Fairfield and State of Connecticut, this 27th day of July, A. D. 1911.

MAX SZEITL.

Witnesses:
WINTHROP A. CLARK,
ALGERNON O. QUIMBY.